(12) United States Patent
Gupta et al.

(10) Patent No.: US 7,280,628 B1
(45) Date of Patent: Oct. 9, 2007

(54) DATA CAPTURE FOR A SOURCE SYNCHRONOUS INTERFACE

(75) Inventors: Chandrasekaran N. Gupta, San Jose, CA (US); Maria George, Santa Clara, CA (US); Lakshmi Gopalakrishnan, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 682 days.

(21) Appl. No.: 10/685,176

(22) Filed: Oct. 14, 2003

(51) Int. Cl.
*H04L 7/00* (2006.01)

(52) U.S. Cl. ...................... 375/355; 375/371; 375/354; 375/373; 375/356; 326/96; 327/144; 327/141; 713/400; 713/500; 713/501; 713/600

(58) Field of Classification Search ................ 375/355, 375/354, 356, 371, 373; 713/400, 500, 501, 713/600; 326/96, 93; 327/144, 141
See application file for complete search history.

(56) References Cited

U.S. PATENT DOCUMENTS

| 6,701,390 | B2* | 3/2004 | Ehmann | 710/33 |
| 6,941,484 | B2* | 9/2005 | To et al. | 713/500 |
| 7,076,377 | B2* | 7/2006 | Kim et al. | 702/66 |
| 2004/0193823 | A1* | 9/2004 | Kelly | 711/168 |

* cited by examiner

*Primary Examiner*—Chieh M. Fan
*Assistant Examiner*—Eva Zheng
(74) *Attorney, Agent, or Firm*—W. Eric Webostad

(57) ABSTRACT

Method and apparatus for data recapture from a source synchronous interface. A data signal is obtained via the source synchronous interface. A timing signal is obtained via the source synchronous interface, where the data signal and the timing signal are provided in association with one another. The timing signal is frequency divided by frequency divider to provide an enable signal. Data of the data signal is captured responsive to the timing signal and the enable signal, where the data captured is in a time domain of the timing signal. A data valid signal is generated from the enable signal and an internal clock signal, where the data valid signal is internally timed without having to determine a system level delay. The data is recaptured responsive to the internal clock signal and the data valid signal, where the recaptured data is in a time domain of the internal clock signal.

29 Claims, 9 Drawing Sheets

DATA CAPTURE FOR A SOURCE SYNCHRONOUS INTERFACE

FIELD OF THE INVENTION

One or more aspects of the invention relate generally to data capture for a source synchronous interface.

BACKGROUND OF THE INVENTION

In a source synchronous environment, a data source ("transmitter") transmits data to a data sink ("receiver") at least partially responsive to a clock signal provided from the receiver to the transmitter. Delays in communication between the transmitter and the receiver, which may include both external and internal delays, can lead to differences in phase between the clock signal and a source timing signal. The source timing signal, provided from the transmitter to the receiver, conventionally is provided in parallel with the data.

Even though the clock signal and the source timing signal may be predicated on having the same frequency within some tolerance, phase differences make it problematic for the receiver to transfer the data from the source timing signal domain to a clock domain of the receiver, which may be the domain of the clock signal. Obtaining data from the transmitter and transferring such data into an internal clock domain of the receiver is known as "data recapture" or just "recapture." Data recapture is made more problematic when the source timing signal is a non-free running clocking signal, such as a strobe signal. Non-free running clock signals from transmitters may be found in a variety of integrated circuits, including, but not limited to, Double Data Rate (DDR) memories and other source synchronous devices. In conventional DDR memories, a strobe signal having a number of clock cycles is transmitted in parallel with the data.

Conventionally, for a source synchronous interface to transfer data from one clock domain to another, an asynchronous first-in, first-out buffer ("FIFO") was used. Use of a FIFO was problematic with non-free running timing signals, such as a strobe signal, where data was first registered in an input/output block. Data registered in an input/output block and then again in a FIFO made pipelining difficult when using a non-free running clock. System level delay calculations have a delay variance making use problematic. With respect to delay variance for example, memory vendors conventionally specify timing uncertainty, such as in the form of a minimum and a maximum delay. This can lead to having to slow clock signal frequency to account for such uncertainty.

Accordingly, it would be desirable and useful to provide data recapture for a source synchronous interface that avoids one or more of the above-mentioned limitations.

SUMMARY OF THE INVENTION

An aspect of the invention is a data communication system having: a first integrated circuit, and a second integrated circuit coupled for source synchronous communication with the first integrated circuit. The second integrated circuit includes a recapture circuit. The recapture circuit is configured to perform internally timed transfers of data, where the data is obtainable from the first integrated circuit in association with a source clock domain. The internally timed transfers of the data are from the source clock domain into an internal clock domain of the second integrated circuit.

Another aspect of the invention is a recapture circuit having a data capture stage, a data validity stage, and a data recapture stage. The data capture stage includes: a first plurality of registers coupled to receive a data signal and a timing signal, and configured to capture data into a clock domain of the timing signal; a frequency divider coupled to receive the timing signal and configured to provide an enable signal, where the enable signal has a frequency less than the frequency of the timing signal. The first plurality of registers are coupled to receive the enable signal and configured to provide a plurality of data phases, where each of the data phases active on one of a leading edge or a lagging edge of the timing signal and one of high state or low state of the enable signal. The data validity stage includes: a second plurality of registers, where an input portion of the second plurality of registers is coupled to receive the enable signal and an internal clock signal and configured to clock off of different edges of the internal clock signal, and where an output portion of the second plurality of registers is coupled in series with the input portion and configured to clock off of different edges of the internal clock signal different from the input portion clockage; and a logical operator is coupled to receive output from the second plurality of registers and configured to provide a data valid signal therefrom. The data recapture stage includes a third plurality of registers clocked responsive to the internal clock signal and write enabled responsive to the data valid signal, where the third plurality of registers is coupled to the first plurality of registers to receive output data therefrom and configured to recapture the output data into a clock domain of the internal clock signal.

Other aspects of the invention are method and apparatus for data recapture from a source synchronous interface. A data signal is obtained via the source synchronous interface. A timing signal is obtained via the source synchronous interface, where the data signal and the timing signal are provided in association with one another. The timing signal is frequency divided to provide a derived timing signal. Data of the data signal is captured responsive to the timing signal and the derived timing signal, where the data captured is in a time domain of the timing signal. A data valid signal is generated from the derived timing signal and a internal clock signal, where the data valid signal is internally timed without having to determine a system level delay. The data is recaptured responsive to the internal clock signal and the data valid signal, where the data recaptured is in a time domain of the internal clock signal.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 2C-1 is a schematic diagram depicting an exemplary embodiment of another portion of the recapture circuit of FIGS. 2A and 2B.

FIG. 2C-2 is a schematic diagram depicting an exemplary alternate embodiment of the portion of recapture circuit of FIG. 2C-1.

DETAILED DESCRIPTION OF THE DRAWINGS

Figure 1:
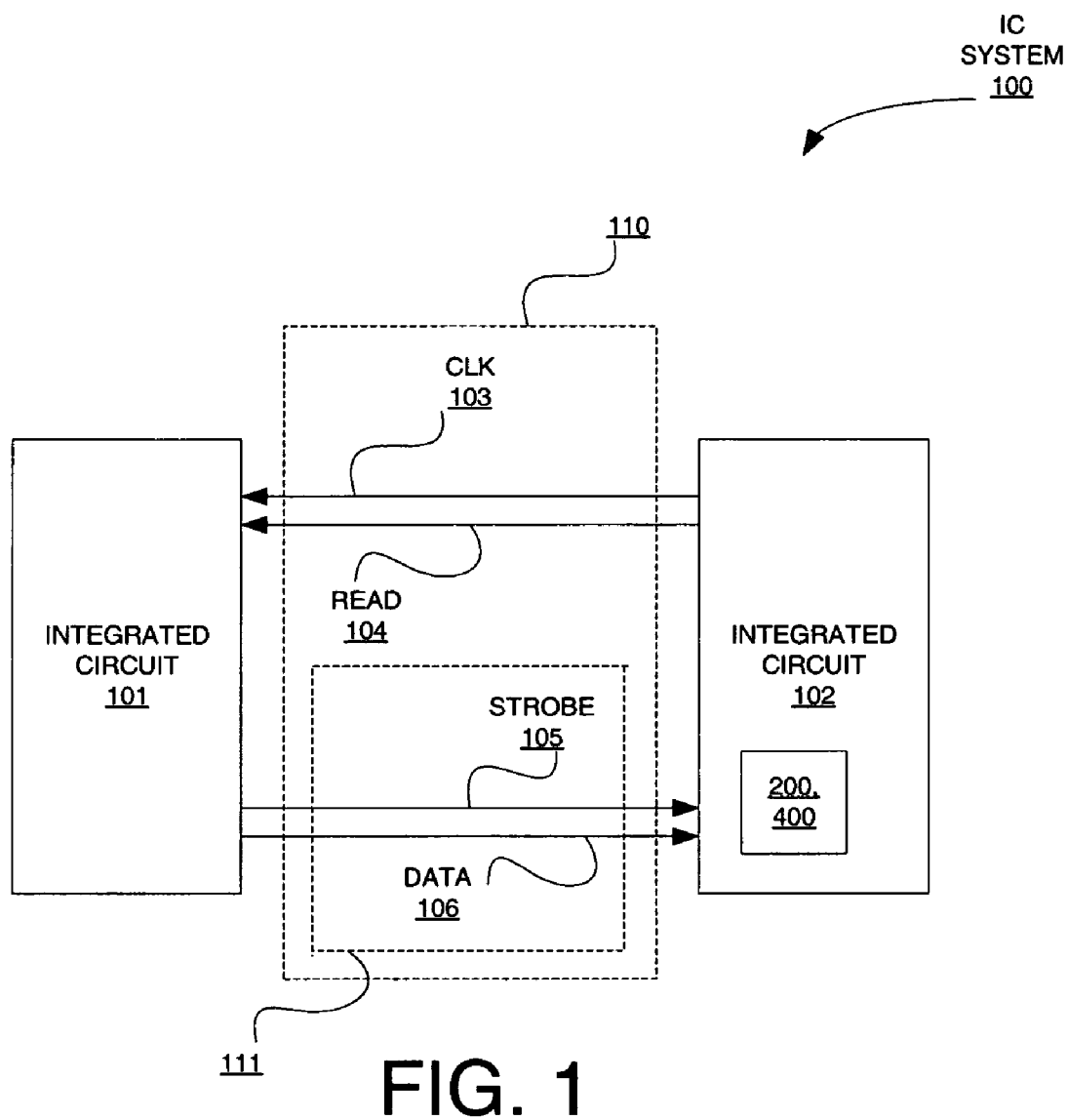
FIG. 1 is a block diagram depicting an exemplary embodiment of an integrated circuit system.

FIG. 1 is a block diagram depicting an exemplary embodiment of an integrated circuit system 100. Integrated circuit system 100 includes integrated circuit 101 and integrated circuit 102. For communication of data, it is assumed that integrated circuit 101 is a data source, and integrated circuit 102 obtains data from integrated circuit 101. Integrated circuit 101 may be any of a variety of known integrated circuits capable of storing data, for example a latching device, a memory device or a device having latches or memory. Integrated circuit 102 includes a data recapture circuit 200, as described below in additional detail. In some embodiments, integrated circuit 101 and/or integrated circuit 202 may comprise a programmable logic device, such as an FPGA (field programmable gate array).

Integrated circuits 101 and 102 communicate with one another via interface 110. Interface 110 has a source synchronous portion, namely, source synchronous interface 111. As interface 110 is conventional, it is not described in unnecessary detail. Basically, integrated circuit 102 provides a timing signal, such as a clock signal 103, to integrated circuit 101. For integrated circuit 102 to obtain data from integrated circuit 101, a read command signal 104 is provided from integrated circuit 102 to integrated circuit 101. Responsive to read command signal 104, integrated circuit 101 provides data signal 106 along with strobe signal 105 to integrated circuit 102.

Conventionally, timing pulses of strobe signal 105 are at least proximally phase and frequency synchronous with data of data signal 106. For purposes of clarity and not limitation, it is assumed that clock signal 103 and timing pulses of strobe signal 105 are at least approximately the same frequency and that clock signal 103 is the internal clock domain into which data of data signal 106 is to be recaptured. However, it should be understood that for recapture selection of an edge that data signal 106 and strobe signal 105 are to be within tolerance of each other and that an internal clock domain may or may not have the same frequency of clock signal 103, for recapture.

Figure 2A:
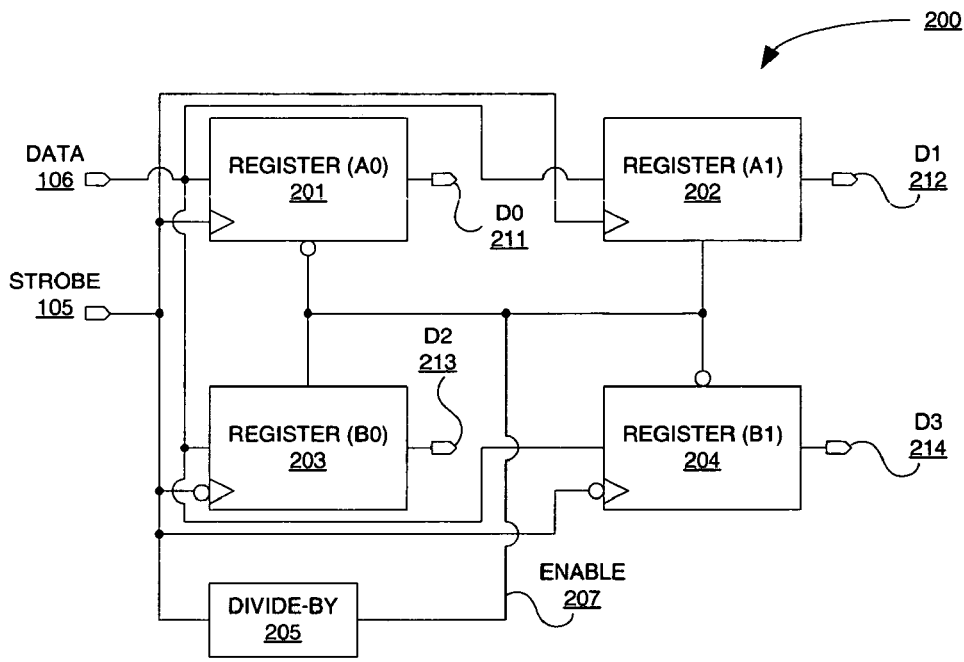
FIG. 2A is a schematic diagram depicting an exemplary embodiment of a portion of a recapture circuit.

FIG. 2A is a schematic diagram depicting an exemplary embodiment of a portion of recapture circuit 200. This portion of recapture circuit 200 is to edge align read data with a source-synchronous timing signal.

Recapture circuit 200 includes registers 201, 202, 203 and 204, and divide-by circuit 205. Notably, though what follows is described in terms of DDR and four phases of an input clock signal for purposes of clarity, it should be understood that data may be held valid for fewer or more than four input clock signal phases and that known signal rates, such as those other than DDR, may be used. Furthermore, though a non-free running signal is described, namely, strobe signal 105, a free-running clock signal may be used.

Data signal 106 and strobe signal 105 are each respectively provided as inputs to registers 201, 202, 203 and 204, where data signal 106 is a data input and strobe signal 105 is a clock input. Registers 201, 202, 203 and 204 are used to capture data of data signal 106. As strobe signal 105 is a non-free running timing signal, only one stage of registers, namely, data input registers 201, 202, 203 and 204, is used for data capture.

Strobe signal 105 input to registers 203 and 204 is complemented. Notably, for purposes of clarity it is assumed throughout that inverters for complementing inputs are part of the registers; however, inverters may be external to the registers. Accordingly, registers 201 and 202 trigger off of one edge, for example a rising edge, and registers 203 and 204 trigger off of another edge, for example a falling edge, of timing pulses of strobe signal 105.

Strobe signal 105 is input to divide-by circuit 205 to provided enable signal 207. Divide-by circuit 205 divides frequency of strobe signal 105, by two in this example, to provide enable signal 207. Notably, division of the frequency of strobe signal 105 is not limited to two, and may depend on the number of input phases of strobe signal 105 for which data is to be held valid. Enable signal 207 is provided as an enable input to each of registers 201, 202, 203 and 204. However, enable signal 207 input is complemented to registers 201 and 204.

Accordingly, though one stage of registers is used, in this example, there are four register phases within the one stage of registers. Two of the registers trigger on a rising edge and two of the registers trigger on a falling edge, and each pair of rising and falling edge triggered registers is enabled from different states of enable signal 207. For example, registers 201 and 204 are enabled responsive to enable signal 207 being a logic zero voltage level ("active low"), and registers 202 and 203 are enabled responsive to enable signal 207 being a logic one voltage level ("active high"). Note that in some embodiments, registers 201-204 may be replaced by four FIFOs to capture incoming data, each clocked and enabled as described in connection with registers 201-204. This allows for a reduction in logic (by eliminating the registers) in applications that use a FIFO.

Figure 3:
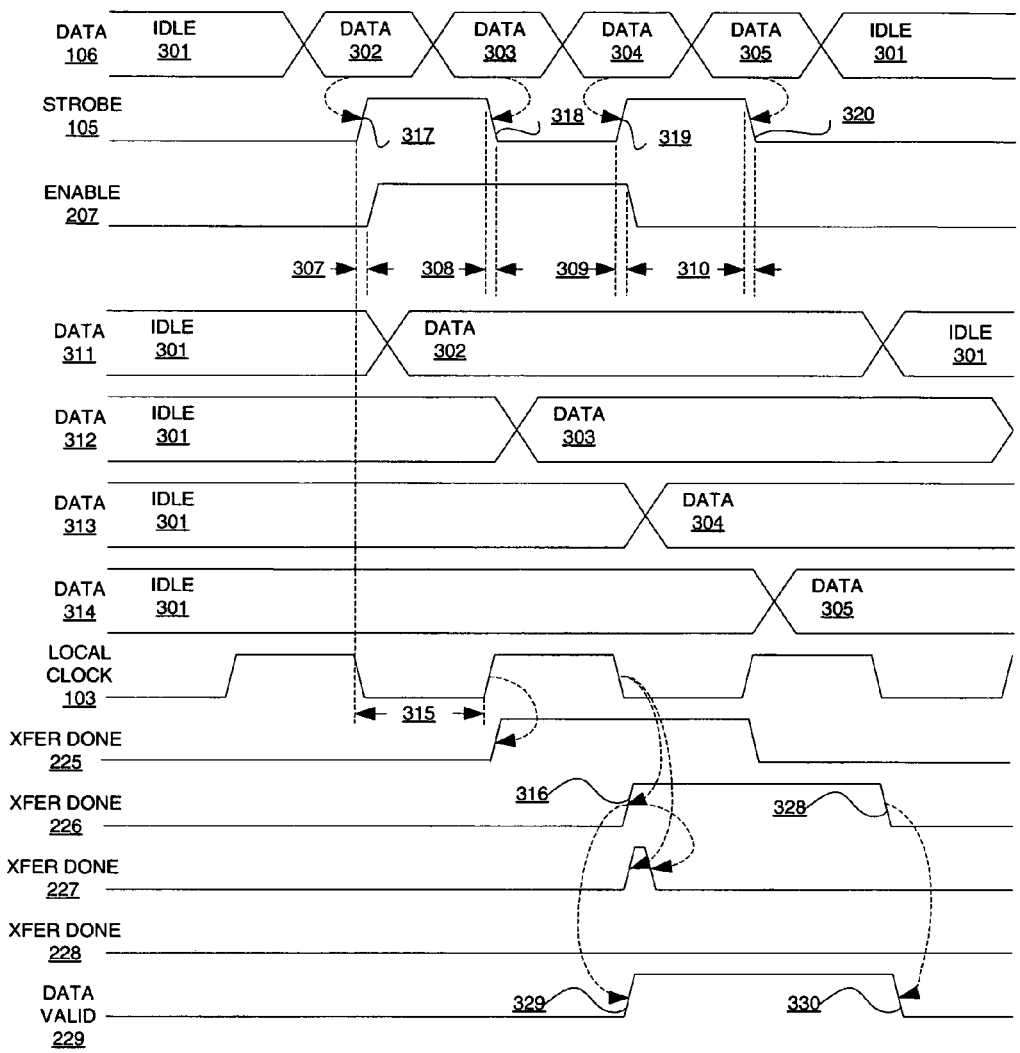
FIG. 3 is a timing diagram depicting an exemplary embodiment of timing of signals for the recapture circuit of FIGS. 2A and 2B.

FIG. 3 is a timing diagram depicting an exemplary embodiment of timing of signals for recapture circuit 200. Between idle states 301 of data signal 106 are four pieces of data. Conventionally, data is transmitted in what is known as "words." Word length conventionally is 16, 32, or 64 bits long, though longer or shorter word lengths may be used. Notably, the four pieces of data in this example may, for example, be two words, where each piece of data is one byte long.

Transmitted with data 302, 303, 304 and 305 is strobe signal 105, such that there may be a timing pulse edge for each piece of data. For example, rising edge 317 may be for data bits 302; falling edge 318 may be for data bits 303; rising edge 319 may be for data bits 304; and falling edge 320 may be for data bits 305.

Enable signal 207, generated from strobe signal 105 as previously described, may be slightly delayed with respect to strobe signal 105, as indicated by intervals 307, 308, 309 and 310 to avoid an indeterminate state. Table I provides a listing of when registers 201, 202, 203 and 204 of FIG. 2A are active as dependent on states of enable signal 207 and strobe signal 105.

TABLE I

| Reg. No. | Enable Signal | Strobe Signal |
| --- | --- | --- |
| 201 | Low (307) | Rising Edge (317) |
| 202 | High (309) | Rising Edge (319) |
| 203 | High (308) | Falling Edge (318) |
| 204 | Low (310) | Falling Edge (320) |

For this example, data bits 302 are captured by register 201 as indicated by data signal 311, data bits 303 are capture by register 203 as indicated by data signal 312, data bits 304 are captured by register 202 as indicated by data signal 313, and data bits 305 are captured by register 204 as indicated by data signal 314. This captured data is still in the time domain of strobe signal 105.

Figure 2B:
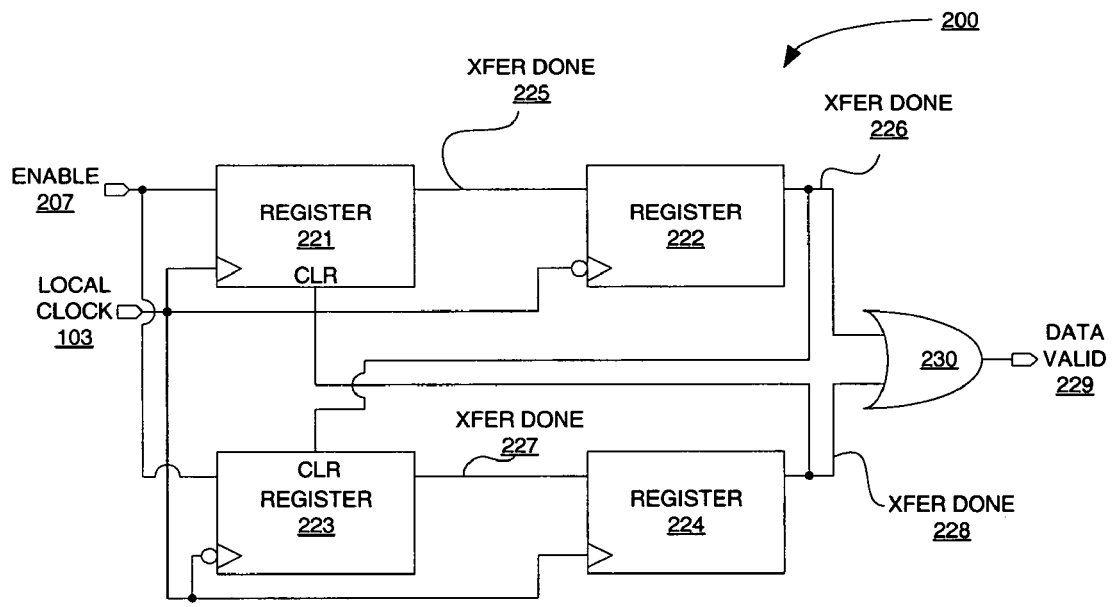
FIG. 2B is a schematic diagram depicting an exemplary embodiment of another portion of the recapture circuit of FIG. 2A.

Referring to FIG. 2B, there is shown a schematic diagram depicting an exemplary embodiment of another portion of recapture circuit 200. This portion of recapture circuit 200 is for generating a data valid signal 229. Recapture circuit 200 includes registers 221, 222, 223 and 224. Enable signal 207 is provided as a data input signal to registers 221 and 223. A write enable (not shown) for registers 221, 222, 223 and 224 may be held active. Registers 221 and 222 are coupled in series such that the data output of register 221 is the data input of register 222, and registers 223 and 224 are coupled in series such that the data output of register 223 is the data input of register 224.

Internal clock signal 103 is provided as a clock input to each of registers 221, 222, 223 and 224. However, clock input to registers 222 and 223 is complemented. Thus, for example, registers 222 and 223 are triggered on a falling edge of internal clock signal 103, and registers 221 and 224 are triggered on a rising edge of internal clock signal 103.

Data input registers 221 and 223 trigger off of different edges of internal clock signal 103, and data output registers 222 and 224 trigger off of different edges of internal clock signal 103. Furthermore, data input register 221 and data output register 222 trigger off of different edges of internal clock signal 103, and data input register 223 and data output register 224 trigger off of different edges of internal clock signal 103. Transfer done signals 226 and 228 respectively from registers 222 and 224 are provided as input to OR gate 230 to provide data valid signal 229. Notably, other logic functions, other than OR gate 230, may be used. Furthermore, if metastability is not an issue, transfer done signals 225 and 227 may be provided to OR gate 230, where registers 222 and 224 could then be omitted.

Internal clock signal 103, being at least approximately the same frequency of timing pulses of strobe signal 105, may yet be out of phase with such timing pulses. Because the phase relationship between internal clock signal 103 and timing pulses of strobe signal 105 is not known, it is not known which transfer done signal will transition first. For example, transfer done signal 225 may lead transfer done signal 227, or transfer done signal 227 may lead transfer done signal 225. Thus, with respect to signals used to produce data valid signal 229, it is unknown whether transfer done signal 226 leads transfer done signal 228, or whether transfer done signal 228 leads transfer done signal 226. However, whichever signal leads is going to be used as a starting point of a write enable signal for writing data into another register stage for data recapture. Furthermore, by having an OR operation on transfer done signals 226 and 228, data valid signal 229 may both begin at the earliest location for which data is valid and continue to the latest location for which data is valid.

Notably, because each transfer done signal 226 and 228 indicates whether a data transfer has been completed, the leading transfer done signal may be used to clear the data input register of the lagging transfer done signal. So, for example, if transfer done signal 226 leads transfer done signal 228, then transfer done signal 226 clears register 223, and if transfer done signal 228 leads transfer done signal 226, then transfer done signal 228 clears register 221.

Returning to FIG. 3, there is a phase difference 315 between strobe signal 105 and internal clock signal 103. Examples of transfer done signals 225, 226, 227 and 228 are shown. In this example, transfer done signal 226 leads transfer done signal 228. However, for a different phase difference 315, transfer done signal 228 may lead transfer done signal 226.

Data valid signal 229 is obtained from transfer done signals 226 and 228. For this example, edge 316 of transfer done signal 226 is used to provide edge 329 of data valid signal 229, and edge 328 of transfer done signal 226 is used to provide edge 330 of data valid signal 229, since in this example transfer done signal 226 leads transfer done signal 228. Thus, data valid signal 229 indicates a beginning time (e.g., edge 329) for when data signal 311 is available and is active for a data recapture period of time until data signal 311 is no longer available (e.g., edge 330).

At this juncture, it should be appreciated that recapture circuit 200 detects a correct edge for data recapture without having to do a system level delay calculation to determine phase difference 315. Thus, generation of data valid signal 229 is self-timed with respect to recapture of data as no separate delay calculation is needed. It should further be understood that generation of data valid signal 229 may be used as a write enable for writing data from a first data register stage into a second data register stage for data recapture.

Figures 1, 2C:
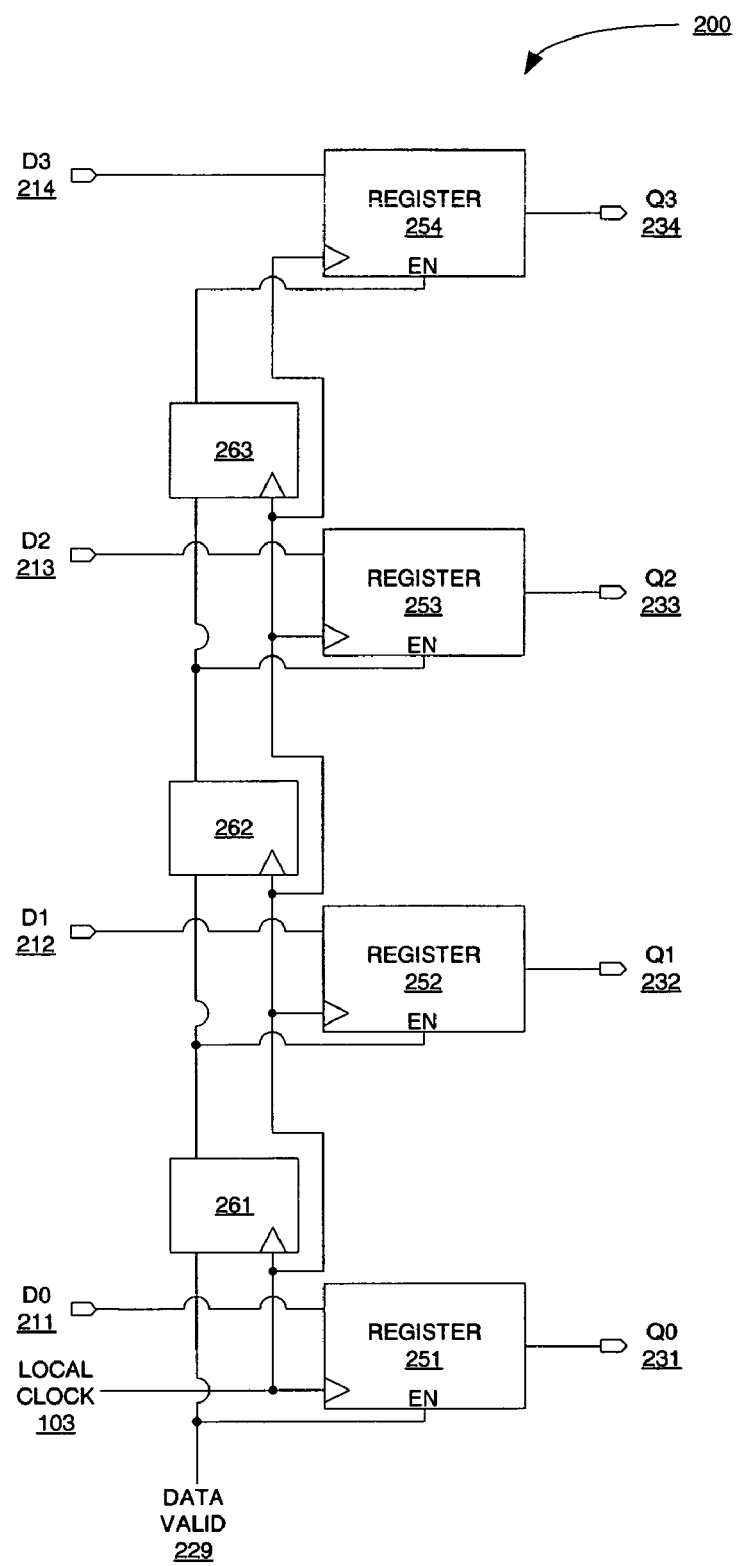

FIG. 2C-1 is a schematic diagram depicting an exemplary embodiment of another portion of recapture circuit 200. Recapture circuit 200 includes registers 251, 252, 253 and 254 which form a second data stage of registers. Data outputs D0 211, D1 212, D2 213 and D3 214 are data inputs to registers 251, 252, 253 and 254, respectively. Internal clock signal 103 is used to clock second stage data registers 251, 252, 253 and 254. Data valid signal 229 is provided to register 251 as a write enable signal for writing data from D0 211 into register 251. Registers 261, 262 and 263, which are also clocked by internal clock signal 103, may be used to propagate the data valid signal 229 for write enable signals for writing data from D1 212, D2 213 and D3 214 into registers 252, 253 and 254, respectively. Data written into registers 251, 252, 253 and 254 responsive to internal clock signal 103 and data valid signal 229 is in the clock domain of internal clock signal 103 and thus is recaptured data. Accordingly, data outputs Q0 231, Q1 232, Q2 233 and Q3 234 are in the time domain of internal clock signal 103.

Figures 2, 2C:
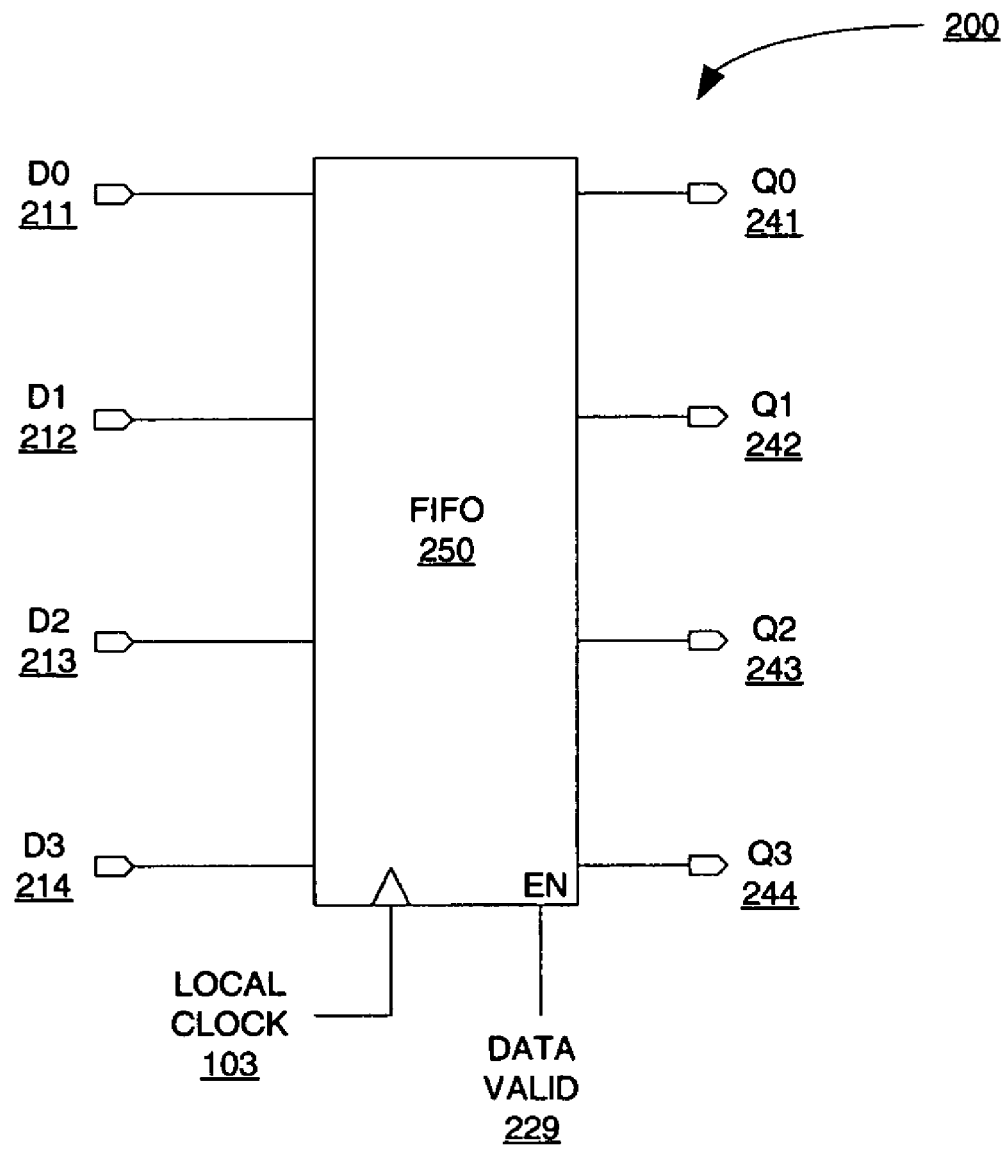

FIG. 2C-2 is a schematic diagram depicting an exemplary alternate embodiment of the portion of recapture circuit 200 of FIG. 2C-1. In this embodiment, a first-in, first-out buffer ("FIFO") 250 replaces registers 251, 252, 253 and 254. For purposes of data recapture, FIFO 250 provides a second stage of data registers, although a conventional FIFO includes both input and output data registers. Data outputs D0 211, D1 212, D2 213 and D3 214 are data inputs to FIFO 250. Internal clock signal 103 is used to clock second stage data FIFO 250. Data valid signal 229 is provided to FIFO 250 as a write enable signal for writing data from D0 211, D1 212, D2 213 and D3 214 into FIFO 250. Data written into FIFO 250 responsive to internal clock signal 103 and data valid signal 229 is in the clock domain of internal clock signal 103 and thus is recaptured data. Accordingly, data outputs Q0 241, Q1 242, Q2 243 and Q3 244 from FIFO 250 are in the time domain of internal clock signal 103.

Figure 4:
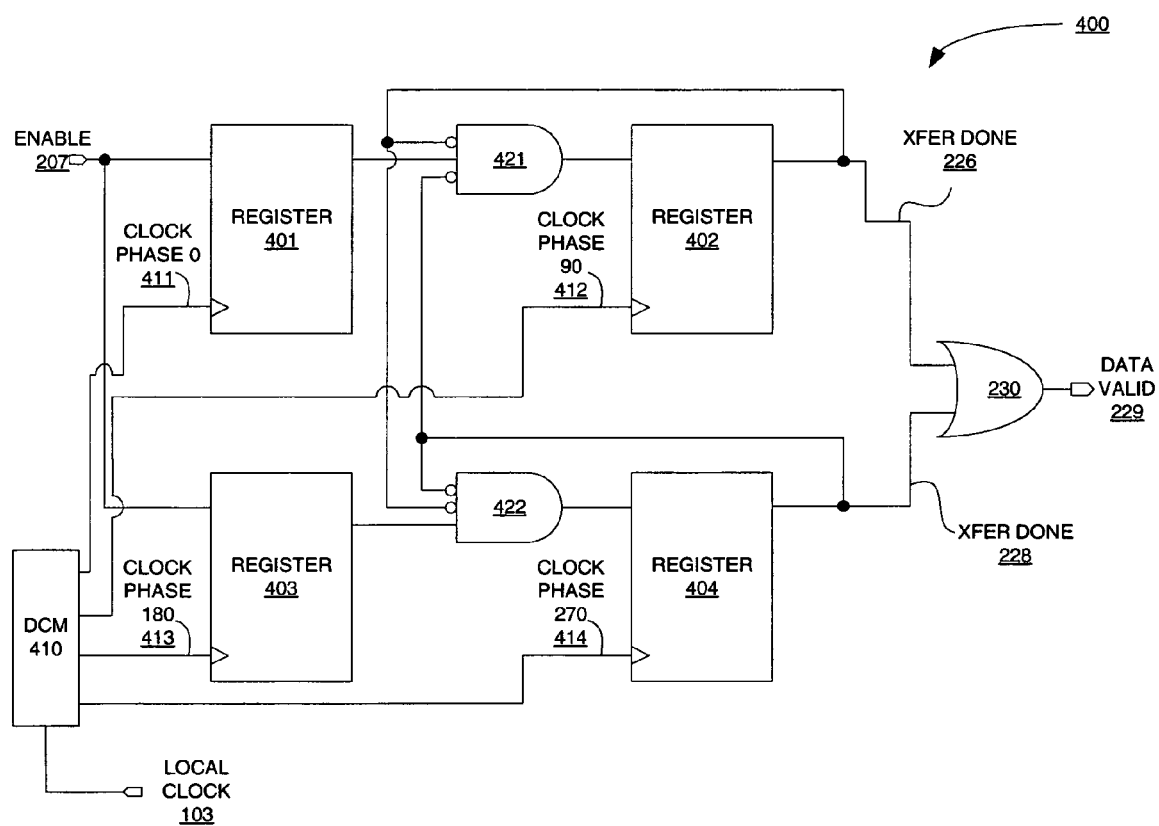
FIG. 4 is a schematic diagram depicting another exemplary embodiment of a portion of a recapture circuit.

FIG. 4 is a schematic diagram depicting another exemplary embodiment of a portion of a recapture circuit 400. Enable signal 207 is provided as data input to a first register stage of registers 401 and 403. Internal clock signal 103 is provided to a digital clock module 410, which provides as output four internal clock signals having four different phases of 0, 90, 180 and 270 degrees, namely, clock phase 0 signal 411, clock phase 90 signal 412, clock phase 180 signal 413 and clock phase 270 signal 414. Clock phase 0 signal 411 clocks register 401, and clock phase 180 signal 413 clocks register 403. Data output of register 401 is provided as input to AND gate 421, and data output of register 403 is provided as input to AND gate 422.

Output from AND gate 421 is provided as data input to register 402, and output from AND gate 422 is provided as data input to register 404. Registers 402 and 404 are part of a second register stage. Clock phase 90 signal 412 clocks register 402, and clock phase 270 signal 414 clocks register 404. Data output from registers 402 and 404 is complemented and fed back as input to AND gates 421 and 422.

Data output of registers 402 and 404 is respectively transfer done signal 226 and transfer done signal 228, which are provided to OR gate 230 to provide data valid signal 229. Other data valid signals may be generated.

Figure 5:
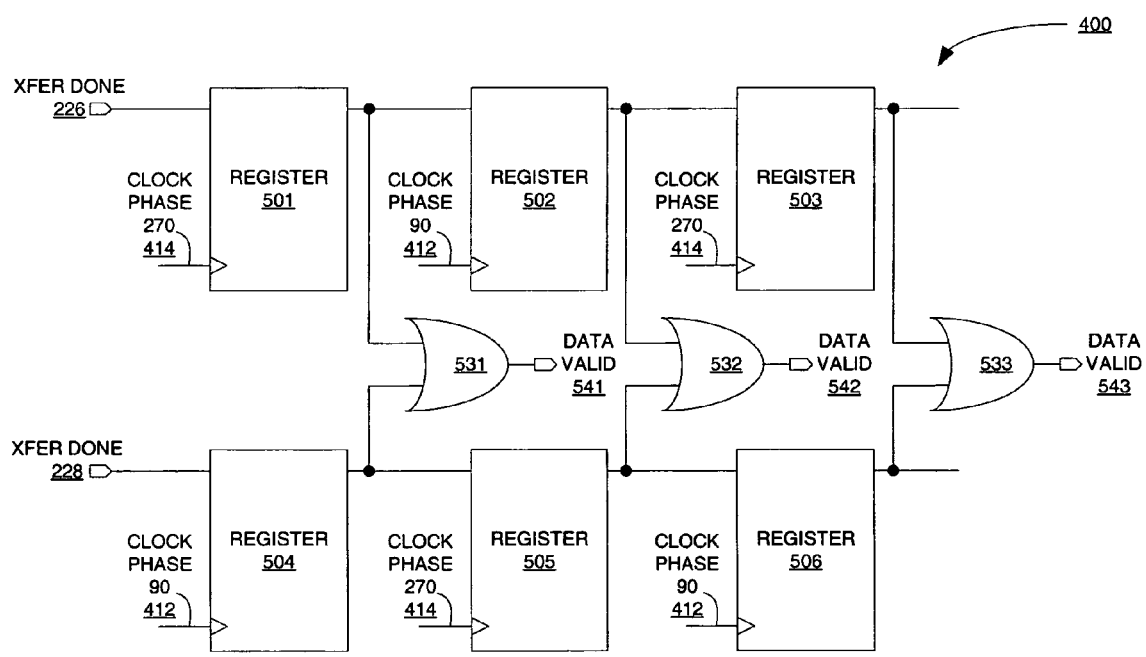
FIG. 5 is a schematic diagram depicting another exemplary embodiment of a portion of the recapture circuit of FIG. 4.

FIG. 5 is a schematic diagram depicting another exemplary embodiment of a portion of recapture circuit 400 of FIG. 4. Transfer done signal 226 and transfer done signal 228 are respectively provided to another stage of registers, namely, registers 501 and 504. Clock phase 90 signal 412 clocks register 504, and clock phase 270 signal 414 clocks register 501. Output from registers 501 and 504 is provided as input to OR gate 531 to generate a data valid signal 541 and respectively provided as input to registers 502 and 505, namely, another stage of registers.

Clock phase 90 signal 412 clocks register 502, and clock phase 270 signal 414 clocks register 505. Output from registers 502 and 505 is provided as input to OR gate 532 to generate a data valid signal 542 and respectively provided as input to registers 503 and 506, namely, another stage of registers.

Clock phase 90 signal 412 clocks register 506, and clock phase 270 signal 414 clocks register 503. Output from registers 503 and 506 is provided as input to OR gate 533 to generate a data valid signal 543.

Notably, it should be understood that in each register stage, each pair of registers are clocked off of signals which are at least approximately 180 degrees out of phase with one another. Furthermore, from a second stage of registers 402 and 404 to subsequent register stages (501, 504), (502, 505) and (503, 506), clocking signals are alternated. For example, registers 402, 501, 502 and 503 are serially connected to provide a data path; however, clocking signals of such registers respectively alternate in phase-shift as 90°, 270°, 90° and 270° phase-shifted signals. Accordingly, a first data valid signal available of data valid signals 229, 541, 542 and 543 may be used.

Figure 6:
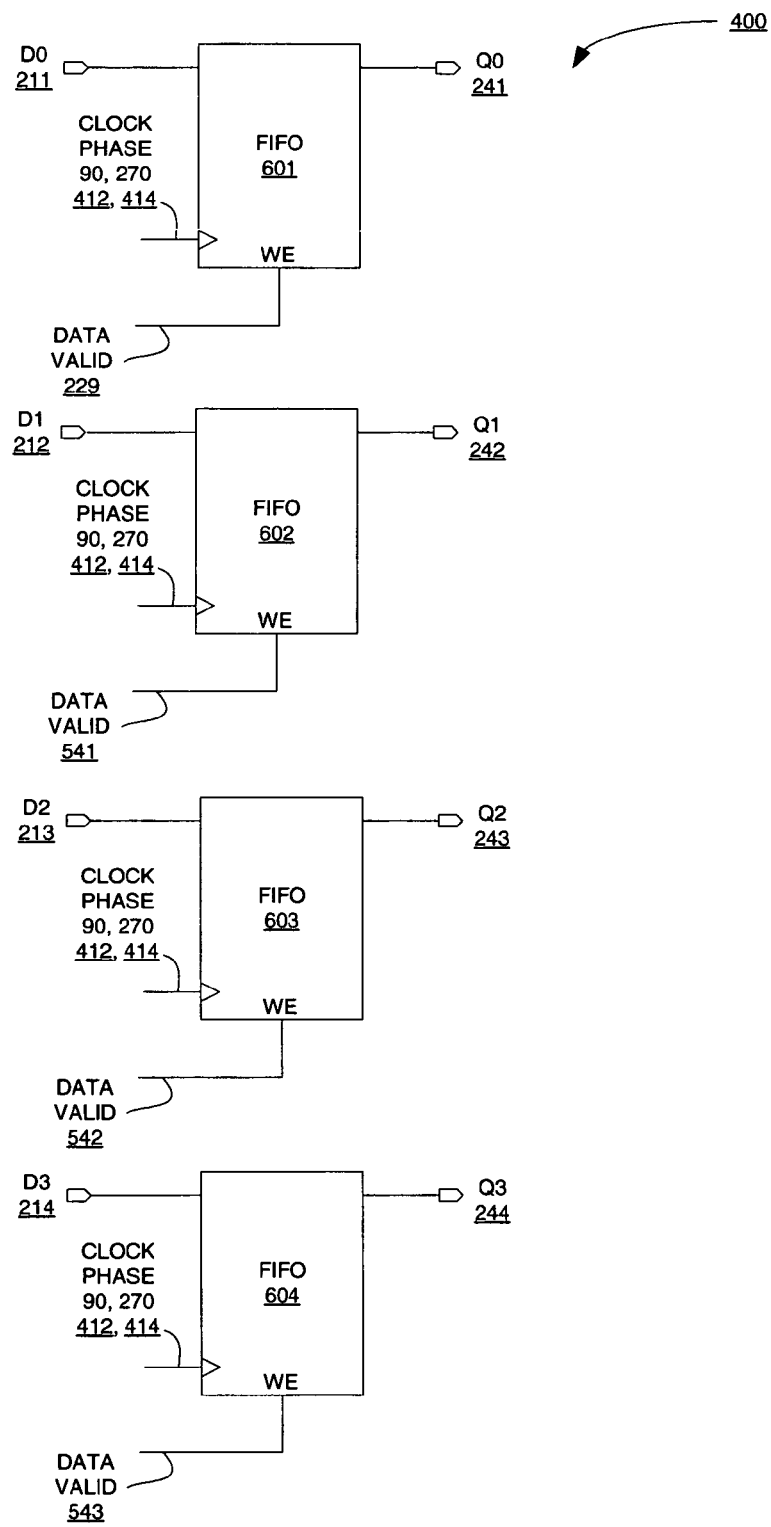
FIG. 6 is a schematic diagram depicting another exemplary embodiment of a portion of the recapture circuit of FIGS. 4 and 5.

FIG. 6 is a schematic diagram depicting another exemplary embodiment of a portion of recapture circuit 400 of FIGS. 4 and 5. FIFOs 601, 602, 603 and 604 may be clocked of either of the clock signals used in second and subsequent register stages. For example, all of FIFOs 601, 602, 603 and 604 may be clocked off of either clock phase 90 signal 412 or clock phase 270 signal 414. Data inputs D0 211, D1 212, D2 213 and D3 214 are for data input respectively to FIFOs 601, 602, 603 and 604. Data valid signals 229, 541, 542 and 543 are respectively provided to FIFOs 601, 602, 603 and 604 as write enable signals. FIFOs 601, 602, 603 and 604 each have a data output, namely, respectively data outputs Q0 241, Q1 242, Q2 243 and Q3 244.

Figure 7:
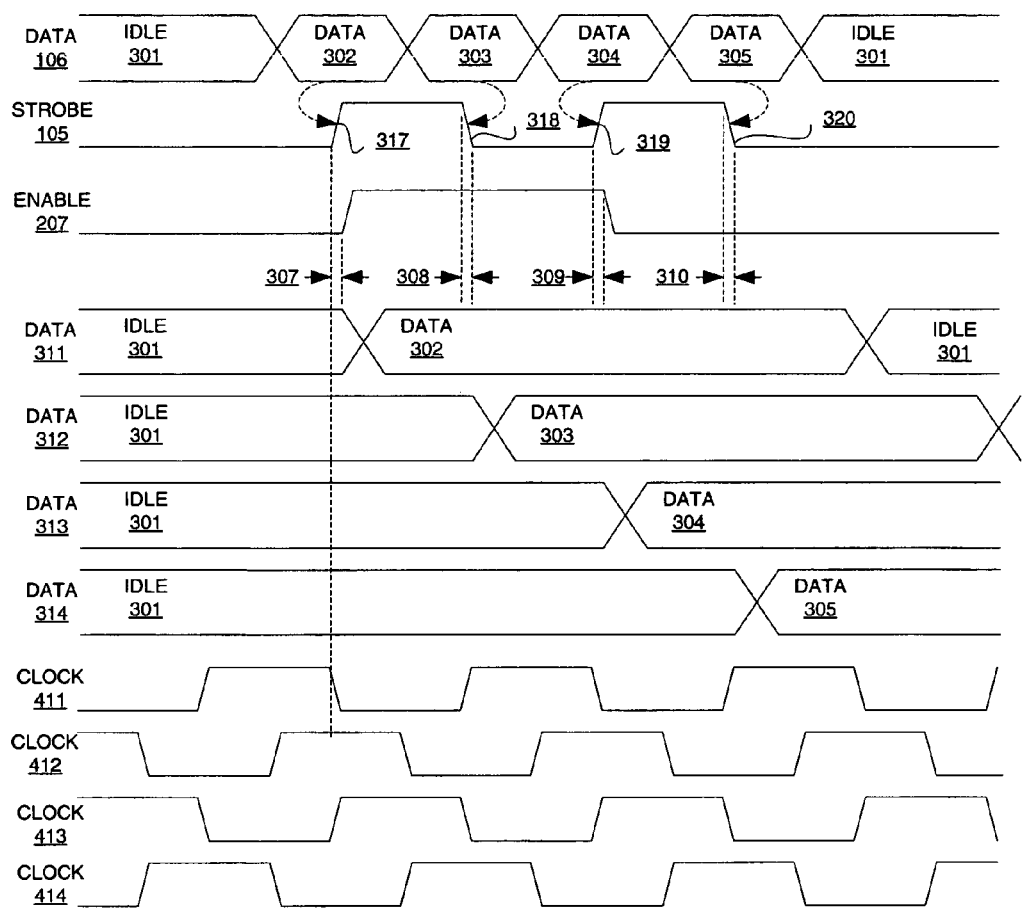
FIG. 7 is a timing diagram depicting an exemplary embodiment of timing of signals for the recapture circuit of FIGS. 4, 5 and 6.

FIG. 7 is a timing diagram depicting an exemplary embodiment of timing of signals for the recapture circuit of FIGS. 4, 5 and 6. As part of timing diagram was previously described, it is not repeated. Clock signals 411, 412, 413 and 414 are shown. From enable signal 207 and clock signals 411, 412, 413 and 414 as applied to recapture circuit 400, transfer done signals 226 and 228 may be resolved. From transfer done signals 226 and 228 as applied to OR gate 230, data valid signal 229 may be resolved. From transfer done signal 226 as applied to registers 501 to 503, transfer done signal 228 as applied to registers 504 to 506, clock signal 414 as applied to registers 501, 503 and 505 and clock signal 412 as applied to registers 502, 504 and 506, data valid signals 541, 542 and 543 from OR gates 531, 532 and 533, respectively, may be resolved. It should be appreciated that each of data valid signals 229, 541, 542 or 543, though a data valid signal may lead another data valid signal, are used to write enable data into an internal clock domain of integrated circuit 102 of FIG. 1.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. For example, embodiments may include single data rate or double data rate, and signaling may be unitary or differential. Furthermore, different numbers of registers may be used depending on the number of data phases used. Claim(s) listing steps do not imply any order of the steps. Trademarks are the property of their respective owners.

What is claimed is:

1. A data communication system, comprising:
    a first integrated circuit; and
    a second integrated circuit coupled for source synchronous communication with the first integrated circuit;
    the second integrated circuit including a recapture circuit, the recapture circuit configured to perform internally timed transfers of data, the data obtainable from the first integrated circuit in association with a source clock domain, the internally timed transfers of the data being from the source clock domain into an internal clock domain of the second integrated circuit;
    wherein the internally timed transfers of data are responsive to a timing signal of the source clock domain from the first integrated circuit and an internal clock signal of the internal clock domain of the second integrated circuit
    wherein the recapture circuit comprises:
        a first data registration stage configured to capture the data in the source clock domain;
        a data valid signal generator configured to provide a valid data signal responsive to the internal clock signal and a derived signal from the timing signal; and
        a second data registration stage configured to recapture the data in the internal clock domain responsive to the data valid signal and the internal clock signal
        wherein the derived signal is provided by dividing frequency of the timing signal.

2. The system, according to claim 1, wherein the derived signal is used as an enable signal for the first data registration stage.

3. The system, according to claim 2, wherein the derived signal is used as a data input signal to the data valid signal generator.

4. The system, according to claim 1, wherein the frequency of the timing signal is at least approximately twice the frequency of the derived signal.

5. The system, according to claim 1, wherein the data valid signal generator is configured to provide the data valid signal by combining two transfer done signals.

6. The system, according to claim 5, wherein one of the two transfer done signals leads the other one of the two transfer done signals.

7. The system, according to claim 1, wherein the second integrated circuit comprises a digital clock module, the digital clock module coupled to receive a clock signal of the internal clock domain and configured to provide a plurality of clock signals, the plurality of clock signals being phases of the clock signal.

8. The system, according to claim 7, wherein the phases of the clock signal are at 0, 90, 180 and 270 degrees to provide the plurality of clock signals.

9. The system, according to claim 1, wherein at least one of the first and second integrated circuits comprises a programmable logic device.

10. The system, according to claim 1, wherein the recapture circuit comprises a plurality of first-in, first-out buffers, each first in, first out buffer responsive to a timing signal of the source clock domain from the first integrated circuit and to an enable signal derived from the timing signal.

11. A recapture circuit, comprising:
   a data capture stage including:
      a first plurality of registers, the first plurality of registers coupled to receive a data signal and a timing signal and configured to capture data into a clock domain of the timing signal;
      a frequency divider coupled to receive the timing signal and configured to provide an enable signal, the enable signal having a frequency less than the frequency of the timing signal;
      the first plurality of registers coupled to receive the enable signal;
      the first plurality of registers configured to provide a plurality of data phases, each of the data phases active on one of a leading edge or a lagging edge of the timing signal and one of high state or low state of the enable signal;
   a data validity stage including:
      a second plurality of registers, an input portion of the second plurality of registers coupled to receive the enable signal and an internal clock signal and configured to clock off of different edges of the internal clock signal, an output portion of the second plurality of registers coupled in series to the input portion and configured to clock off of different edges of the internal clock signal different from the input portion clockage;
      a logical operator coupled to receive output from the second plurality of registers and configured to provide a data valid signal therefrom; and
   a data recapture stage including:
      a third plurality of registers, the third plurality of registers clocked responsive to the internal clock signal and write enabled responsive to the data valid signal, the third plurality of registers coupled to the first plurality of registers to receive output data therefrom and configured to recapture the output data into a clock domain of the internal clock signal.

12. The recapture circuit, according to claim 11, wherein the timing signal is a non-free running clock signal.

13. The recapture circuit, according to claim 11, wherein the timing signal is a strobe signal.

14. The recapture circuit, according to claim 13, wherein the internal clock signal and timing pulses of the strobe signal are at least approximately equal in frequency.

15. The recapture circuit, according to claim 13, wherein the internal clock signal and timing pulses of the strobe signal are out of phase.

16. The recapture circuit, according to claim 15, wherein the third plurality of registers is provided with a first-in, first-out buffer.

17. The recapture circuit, according to claim 11, wherein the timing signal is a free running clock signal.

18. The recapture circuit, according to claim 11, wherein the data recapture stage further includes a fourth plurality of registers propagating the data valid signal to the third plurality of registers for write enabling the third plurality of registers.

19. A method for data recapture from a source synchronous interface, comprising:
   obtaining a data signal via the source synchronous interface;
   obtaining a timing signal via the source synchronous interface, the data signal and the timing signal being provided in association with one another;
   dividing frequency of the timing signal to provide a derived timing signal;
   capturing data of the data signal responsive to the timing signal and the derived timing signal, the data captured in a time domain of the timing signal;
   generating a data valid signal from the derived timing signal and an internal clock signal, the data valid signal being internally timed without having to determine a system level delay; and
   recapturing the data responsive to the internal clock signal and the data valid signal, the data recaptured being in a time domain of the internal clock signal.

20. The method, according to claim 19, wherein the capturing of the data comprises generating a plurality of data phases from the timing signal and the derived timing signal.

21. The method, according to claim 20, wherein the data valid signal generation comprises generating respective transfer done signals, wherein one of the transfer done signals leads the other of the transfer done signals.

22. The method, according to claim 21, wherein the transfer done signals are combined using a logical operator.

23. The method, according to claim 22, wherein the logical operator is an OR operator.

24. An apparatus for data recapture from a source synchronous interface, comprising:
   means for obtaining a data signal via the source synchronous interface;
   means for obtaining a timing signal via the source synchronous interface, the data signal and the timing signal being provided in association with one another;
   means for dividing frequency of the timing signal to provide a derived timing signal;
   means for capturing data of the data signal responsive to the timing signal and the derived timing signal, the data captured in a time domain of the timing signal;

means for generating a data valid signal from the derived timing signal and an internal clock signal, the data valid signal being internally timed without having to determine a system level delay; and means for recapturing the data responsive to the internal clock signal and the data valid signal, the data recaptured being in a time domain of the internal clock signal.

25. A recapture circuit, comprising:

a data capture stage including:
   a first plurality of registers, the first plurality of registers coupled to receive a data signal and a timing signal and configured to capture data into a clock domain of the timing signal;
   a frequency divider coupled to receive the timing signal and configured to provide an enable signal, the enable signal having a frequency less than the frequency of the timing signal;
   the first plurality of registers coupled to receive the enable signal;
   the first plurality of registers configured to provide a plurality of data phases, each of the data phases active on one of a leading edge or a lagging edge of the timing signal and one of high state or low state of the enable signal;

a data validity stage including:
   a second plurality of registers, an input portion of the second plurality of registers coupled to receive the enable signal and an internal clock signal and configured to clock off of different phases of the internal clock signal, an output portion of the second plurality of registers coupled in series to the input portion and configured to clock off of different phases of the internal clock signal different from the input portion clockage;
   a logical operator coupled to receive output from the second plurality of registers and configured to provide a data valid signal therefrom; and a data recapture stage including:
   a third plurality of registers, the third plurality of registers clocked responsive to the internal clock signal and write enabled responsive to the data valid signal, the third plurality of registers coupled to the first plurality of registers to receive output data therefrom and configured to recapture the output data into a clock domain of the internal clock signal.

26. The recapture circuit, according to claim 25, wherein the phases of the internal clock signal provided to the input portion of the second plurality of registers are 0 and 180 degrees.

27. The recapture circuit, according to claim 26, wherein the phases of the internal clock signal provided to the output portion of the second plurality of registers are 90 and 270 degrees.

28. The recapture circuit, according to claim 26, further comprising a digital clock module coupled to receive the internal clock signal and configured to provide the internal clock signal with the phases of 0, 90, 180 and 270 degrees.

29. The recapture circuit, according to claim 25, wherein the third plurality of registers is provided with at least one first-in, first-out buffer.

* * * * *